May 4, 1954   E. E. LINDENBEIN   2,677,184
SAW ATTACHMENT
Filed Sept. 13, 1950
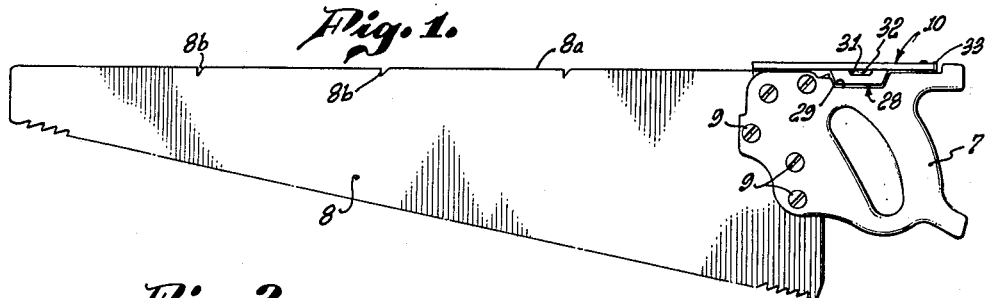
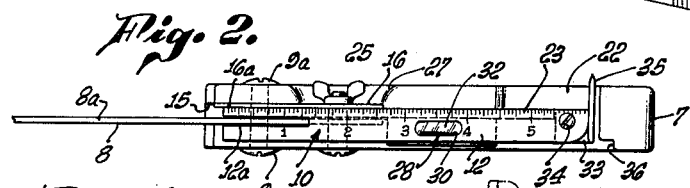
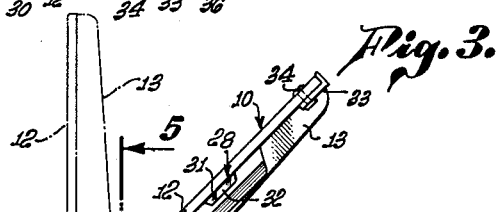
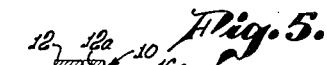
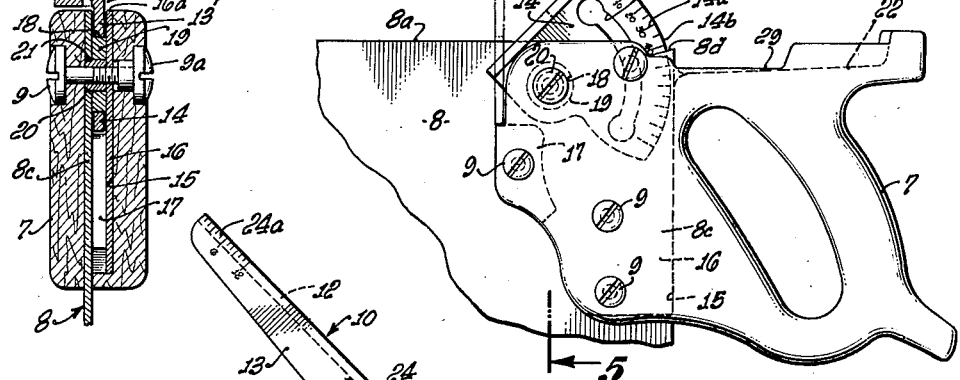
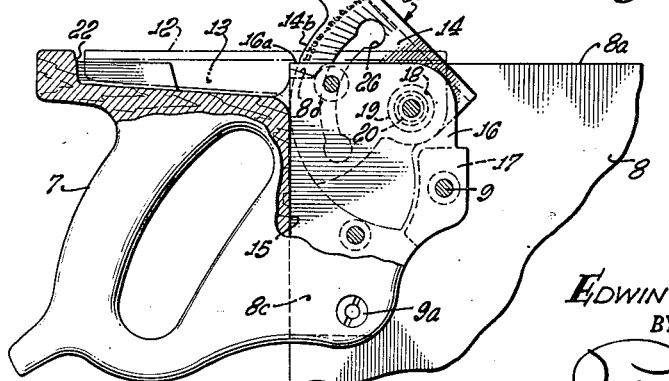
INVENTOR.
EDWIN E. LINDENBEIN,
BY
Paul A. Weilein
ATTORNEY.

Patented May 4, 1954

2,677,184

UNITED STATES PATENT OFFICE 2,677,184

SAW ATTACHMENT

Edwin E. Lindenbein, Los Angeles, Calif.

Application September 13, 1950, Serial No. 184,546

6 Claims. (Cl. 33—75)

This invention relates in general to saws and in particular to a saw having measuring facilities combined therewith.

It is an object of this invention to provide an improved saw of this type.

It is another object of this invention to provide a saw wherein a square, a protractor, a spirit level and other useful facilities are combined therewith so as to form a compact unit structure which does not add to the saw any objectionable bulk and affords a most convenient selective use of such facilities.

It is another object of this invention to provide a saw such as described in which the instrument facilities when not in use are disposed so as not to interfere with the normal use of the saw.

It is another object of this invention to provide a saw such as described wherein a single element is mounted for movement from a retracted position on the saw handle to various positions for different measurement uses.

It is a further object of this invention to provide a saw such as described having a novel form of marking or scribing element for marking the work as measured by the facilities embodied in the saw.

It is an additional object to provide a saw of the character described wherein the instrument facilities reinforce and strengthen the saw handle.

This invention possesses many other advantages and has other objects which may be made more easily apparent from a consideration of one embodiment of the invention. For this purpose there is shown one form in the drawing accompanying and forming part of the present specification. This form will now be described in detail, illustrating the general principles of the invention; but it is to be understood that this detailed description is not to be taken in a limiting sense, since the scope of the invention is best defined by the appended claims.

Referring to the drawings:

Fig. 1 is a side elevation of a saw embodying the present invention;

Fig. 2 is an enlarged fragmentary top plan view of the saw, showing the marking element in position of use;

Fig. 3 is an enlarged fragmentary side elevation of the saw looking toward the side shown in Fig. 1, showing how certain of the measuring facilities may be used;

Fig. 4 is a fragmentary top plan view of the handle showing the marking element in retracted position;

Fig. 5 is a sectional view taken on the line 5—5 of Fig. 3, with the measuring means in retracted position; and Fig. 6 is a fragmentary side elevation of the side of the saw opposite that shown in Fig. 3, showing how the rafter angle gauge may be used.

As shown in the accompanying drawing, a saw constructed in accordance with this invention has a handle 7 secured to the saw blade 8 by means of countersunk screw-headed bolts and nuts 9 and 9a respectively. This handle is of conventional form except as modified somewhat to accommodate the measuring or gauging elements which will be hereinafter fully described. The saw blade 8 has a straight back or upper edge 8a whereby the blade may be used for taking lineal measurements and as a part of a square and protractor. As here shown, it is marked or graduated in six inch lengths by means of notches 8b although any suitable markings may be used to indicate any desired graduation of the straight edge.

A combined square and protractor member generally designated 10 is pivoted on the saw handle for cooperation with the straight edge 8a of the saw blade in making measurements as a square or protractor as indicated in Figs. 3 and 6. As here shown, the member 10 comprises an elongated flat straight edge element 12 of rectangular cross section from one longitudinal edge of which a flange 13 is extended at right angles thereto. The flange 13 is extended adjacent one end to form a plate-like mounting portion 14 corresponding in thickness to the flange and which extends into the saw blade-receiving slot 15 in the saw handle for pivotal mounting therein. In this connection it should be noted that the portion 8c of the saw blade (see Fig. 5) which extends into the slot 15 is disposed to one side of the center of the slot with one side thereof in contact with one side wall of the slot to provide a space in the slot for reception of the plate-like portion 14. The other side wall of the slot 15 is lined with a plate 16 of generally rectangular form (see Figs. 5 and 6) whereby the portion 14 is disposed between and freely movable relative to the saw blade and the lining plate 16. The lining plate 16 is laterally enlarged to form adjacent the outer edge thereof a spacing block 17 which as shown in Figs. 3 and 5, is disposed forwardly and below the pivot of the portion 14. This block holds the lining plate 16 and saw blade portion 8c spaced apart whereby the portion 14 of member 10 is freely movable in the slot 15 of the saw handle. The block 17 is suitably apertured so that one of the bolts 9 is extended therethrough.

As shown in Fig. 5, the plate portion 14 is provided with an opening 18 in which is mounted an annular bearing 19 supported on a spacer sleeve 20 mounted on one of the bolts 9, said sleeve being seated in an opening 21 in the saw blade. This arrangement provides a pivotal mounting for the member 10, whereby said member is movable from a retracted position lying in a recess 22 in the top of the handle, into positions for use as a square or as a protractor and vice versa. When moved upwardly for use as a square the straight edge element 12 of member 10 is limited to a position forming a right angle with the saw edge 8a by means of the end of the member 13 adjacent the pivot, engaging the top of the spacer block 17 as shown in Fig. 3. In this connection it should be noted that the element 12 is slotted as at 12a to receive the saw blade when moved from its retracted position.

Figs. 1 and 2, show how the member 10 when in the recess 22 in the saw handle will be substantially flush with adjacent surfaces of the handle and will not interfere with the use of the saw or provide any objectionable projection from the handle.

As here provided, the straight edge element 12 of member 10 is six inches long in keeping with the graduation of the saw edge 8b, and is graduated as at 23 in inches and divisions of inches, as shown in Fig. 2. Thus, from the top of the saw to the outer end of the member 12, measured along the edge 8a, the distance is 30 inches and said edge and the member 12 serves as a convenient measuring straight edge.

In order that the element 12 may be used as a protractor, the plate portion 14 is provided with quadrant scale 14a on one side adjacent a curved edge 14b thereof, which edge is concentric with the pivot. The graduations of the quadrant scale are visible when the member 12 is swung out of retracted position as shown in Fig. 3. The upper corner of the saw blade 8 adjacent the quadrant scale as shown in Fig. 3 is notched to provide an edge 8d which is radial to the pivot and serves as a pointer in reading the scale. On the other side of the plate portion 14, as shown in Fig. 6, is a rafter angle scale 24 which is read against the upper edge 16a of the plate 16.

On the same side of member 10 as the scale 24 but on the outer end portion the flange 13 as shown in Fig. 6 is a scale 24a graduated in twelfths of an inch, subject to convenient use by carpenters and the like.

The member 10 may be releasably held at any angular position between a position forming a right angle with the saw edge 8a and its retracted position as well as in its extreme positions, by means of one of the bolts 9 and wing nut 25 on the bolt. This bolt extends through an arcuate slot 26 in the plate portion 14, as shown in Figs. 3 and 6, so that on tightening the nut 25 the plate portion will be clamped between the lining plate 16 and the saw blade.

The nut 25 is disposed in an opening 27 in one side of the handle 7 so as to bear against the lining plate 16 and to be readily accessible without projecting outwardly from the handle.

A spirit level 28 is provided on the under side of the member 12 and is accommodated in a deepened portion 29 of the recess 22 in the handle 7 when the member 10 is in retracted position. Windows 30 and 31 in the top of member 12 and in sides of the spirit containing body 32 respectively, provide for a convenient reading of the level in all positions of adjustment of the member 10.

As a means for marking or scribing on work, an angular member 33 is pivoted as at 34 on the under side of the free end of the element 12 and adapted to be turned from a position in which the scribing point 35 thereon lies within the recess 22 as shown in Fig. 4 to a position on which said point extends laterally outward from the side of the handle, ready for use, as shown in Fig. 2. A shoulder 36 obstructs this pivotal movement of the member 33 when the point is in retracted position in recess 22, as will be apparent in Fig. 4, thus making it necessary to lift the free end of member 12 out of the recess to clear this shoulder before the point 35 may be disposed in position of use, after which the member 12 may be returned to retracted position if desired, as shown in Fig. 2.

I claim:

1. In a tool having a flat member and a handle having a slot therein receiving said flat member with one side thereof lining one wall of the slot, a plate lining the opposite wall of said slot, a spacing element interposed in said slot between said plate and said flat member, an elongated member having a straight edge, a mounting portion joined to said elongated member and disposed in said slot between said flat member and said plate, means pivotally mounting said portion in said slot for movement to extend said elongated member outwardly from said handle, and means for releasably restraining said elongated member against movement.

2. In a tool having a flat member and a handle having a slot therein receiving said flat member with one side thereof against one wall of the slot, a plate against the opposite wall of said slot, a spacing element interposed in said slot between said plate and said flat member, an elongated member having a straight edge, a mounting portion joined to said member and disposed in said slot between said flat member and said plate, means pivotally mounting said portion in said slot, and means on the handle for releasably restraining said mounting portion against movement, said elongated member extending laterally from said mounting portion and adapted to lie on said handle.

3. In a tool having a flat member and a handle having a slot therein opening along one edge and at one end thereof, with said flat member disposed in said slot against one wall of the slot, a plate lining the opposite wall of said slot, a spacing element interposed in said slot between said plate and said flat member, an elongated member having a straight edge, a flange along one longitudinal edge of said elongated member adapted to extend into said slot between said plate and said flat member, an extension of said flange adjacent one end of the flange, means pivotally mounting said extension in said slot and means for releasably restraining pivotal movement of said extension.

4. In a tool having a flat member and a handle having a slot therein opening along one edge and at one end thereof, said flat member being disposed in said slot against one wall of the slot, a plate lining the opposite wall of said slot, a spacing element interposed in said slot between said plate and said flat member, an elongated member having a straight edge, a flange along one longitudinal edge of said elongated member adapted to extend into said slot, an extension of said flange adjacent one end of the flange, means pivotally mounting said extension in said slot between said flat member and said plate and means for releasably restraining pivotal movement of said extension, said elongated member having a slot therein for reception of a part of said flat member on pivotal movement of said extension.

5. In a tool having a flat member and a handle having a slot in which said flat member is disposed with one side thereof lining one wall of the slot, a plate lining the opposite wall of said slot, a spacing element interposed in said slot between said plate and said flat member, an elongated member having a straight edge, a flange along one longitudinal edge of said elongated member adapted to extend into said slot, an extension of said flange adjacent one end of the flange, said extension having a slot therein, a screw threaded fastening extending through said handle and the slot in said extension, and a nut on said fastening operable for clamping said extension between said flat member and said plate.

6. In a tool having a flat member and a handle wherein the handle is provided with a slot in which said flat member is disposed to lie against one wall of the slot; a plate lining the opposite wall of said slot, a spacing element interposed between said plate and said flat member, an elongated member having a portion extending between said plate and said flat member, a fastening element extending into the handle and through said flat member, said portion and said plate; a spacer member mounted on said fastening element between said plate and said flat member, said portion having an opening therein, and an annular bearing member surrounding said spacer member and mounted in said opening, providing a pivotal mounting for said elongated member.

References Cited in the file of this patent

UNITED STATES PATENTS

| Number | Name | Date |
| --- | --- | --- |
| 939,051 | Mathews | Nov. 2, 1909 |
| 953,863 | Shaw | Apr. 5, 1910 |
| 1,136,790 | Funk | Apr. 20, 1915 |
| 1,137,838 | Cline | May 4, 1915 |
| 1,301,996 | Barr | Apr. 29, 1919 |
| 1,331,368 | Peters | Feb. 17, 1920 |
| 1,385,855 | Balod | July 26, 1921 |
| 2,251,008 | Sigmon | July 29, 1941 |